United States Patent [19]

Hamel

[11] Patent Number: 4,604,674
[45] Date of Patent: Aug. 5, 1986

[54] RECLOSING RELAY APPARATUS

[75] Inventor: Richard G. Hamel, Margate, Fla.

[73] Assignee: Westinghouse Electric Corp., Pittsburgh, Pa.

[21] Appl. No.: 712,315

[22] Filed: Mar. 13, 1985

Related U.S. Application Data

[63] Continuation of Ser. No. 527,887, Aug. 30, 1983, abandoned.

[51] Int. Cl.$^4$ .......................... H02H 3/06; H02H 3/07
[52] U.S. Cl. .......................................... 361/73; 361/72
[58] Field of Search ...................... 361/71, 72, 73, 74, 361/75, 62

[56]  References Cited

U.S. PATENT DOCUMENTS 3,560,798  2/1971  Tenebaum et al. .................... 361/73
3,801,872  4/1974  Zocholl et al. ......................... 361/73
3,878,436  4/1975  Bogel ..................................... 361/72

OTHER PUBLICATIONS

"Automatic Reclosing Relays", Bulletin 41-660—Westinghouse, May 1972.
"Type DRC Reclosing Relay", Bulletin 41-667—Westinghouse, Jul. 1973.
"Solid State Reclosing Relays", Bulletin 41-668—Westinghouse, Sep. 1972.

Primary Examiner—A. D. Pellinen
Assistant Examiner—H. L. Williams
Attorney, Agent, or Firm—W. E. Zitelli

[57]  ABSTRACT

A reclosing relay for reclosing a circuit breaker in an electrical power system. The reclosing relay is a multishot reclosing relay (i.e., providing more than one reclosure command to the circuit breaker) and includes primary and redundant lockout circuits for each reclose circuit. The primary lockout scheme employs a flip-flop, with a reset timer for resetting if the breaker remains closed after the first reclosure. The flip-flop is set when the circuit breaker recloses to lockout the first reclosure circuit. The redundant lockout circuit locks out the first reclosure circuit after a trip, reclose, and retrip sequence. The second reclose circuit includes similar primary and redundant lockout circuits.

4 Claims, 1 Drawing Figure

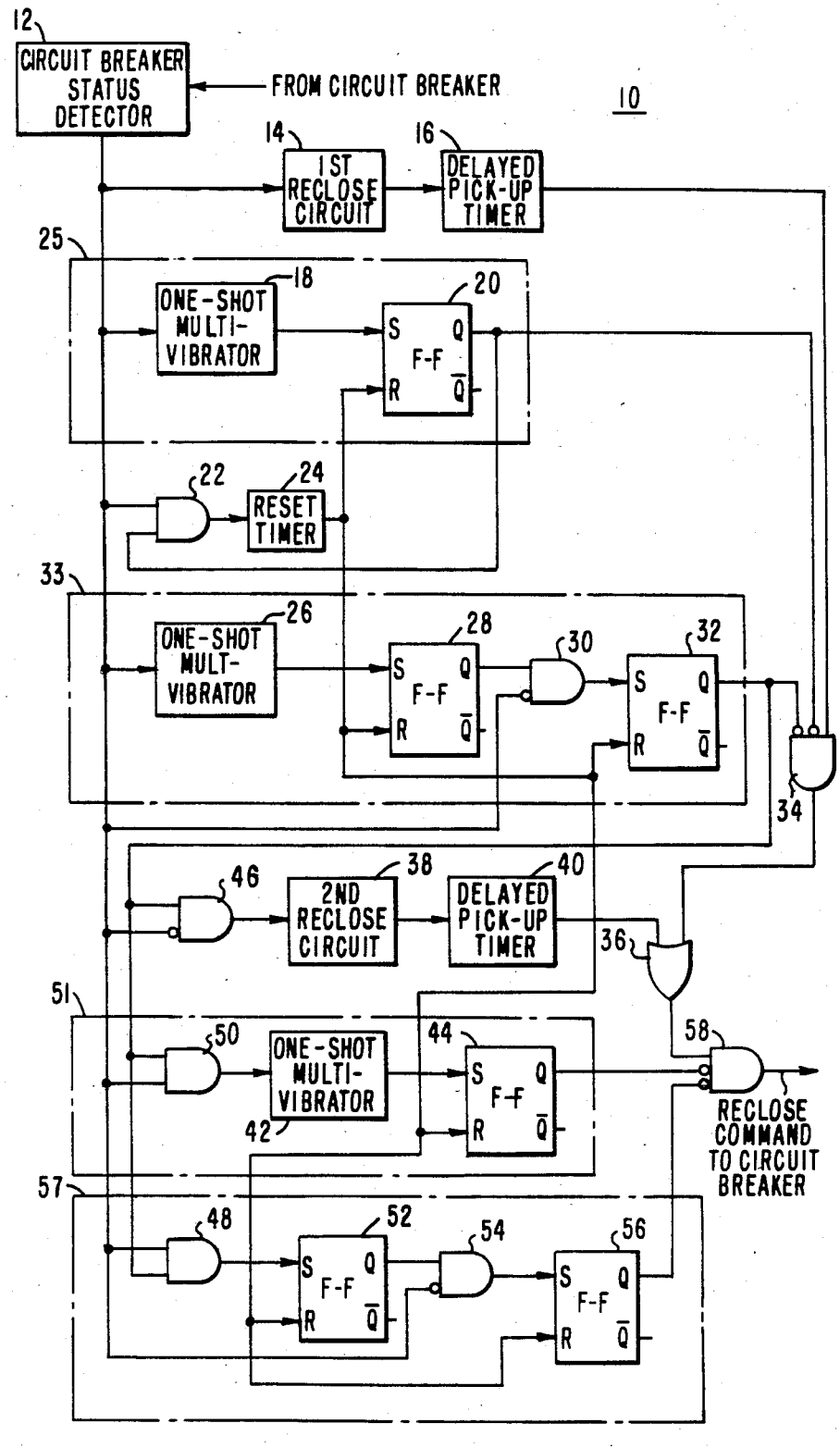

RECLOSING RELAY APPARATUS

This application is a continuation of application Ser. No. 527,887, filed Aug. 30, 1983, now abandoned.

BACKGROUND OF THE INVENTION

1. Field of the Invention

This invention relates generally to reclosing relays, and more specifically to a reclosing relay employing a redundant lockout scheme to prevent circuit breaker pumping.

2. Description of the Prior Art

Electrical transmission lines and power generating equipment must be protected against insulation faults and consequent short circuits that can cause collapse of the power system and serious and expensive apparatus damage. For instance, such a fault condition is caused by lightning-induced flashover from a transmission line to ground or between adjacent transmission line conductors. Under such a fault condition, line currents can increase to several times the normal value, thereby causing loss of synchronism among generators and damaging or destroying both the transmission line and the attached equipment. To avoid equipment damage and collapse of the entire power system, faulted apparatus on the main transmission line are isolated from the network by protective relays. The protective relays, by continuously monitoring ac voltages and currents, locate line faults and initiate line isolation via tripping of the appropriate circuit breakers. These faults are located by examining the relationship of the ac voltages and currents.

The large majority of faults on transmission line conductors are transient and can be cleared by momentarily deenergizing the transmission line. Utility reports indicate that less than 10% of all faults are permanent. It is therefore feasible to improve continuity of electrical service by automatically reclosing the circuit breaker after the protective relay opens it. This is the function of a reclosing relay. The reclosure should be timed to allow deionization of the arc. Automatic reclosing greatly improves service in radial distribution transmission line systems where continuity of service is directly affected by circuit interruption. High speed reclosing on tie lines, if successful, also assists in maintaining system stability.

One type of prior art reclosing relay monitors the status of the circuit breaker and provides a single reclose command to the circuit breaker when it opens. Upon reclosure, the reclose circuit is locked out. If the breaker reclosure is successful, the reclosing relay returns to its normal state after a reset timer completes its timing cycle. This type of reclosing relay is a single-shot reclosing relay.

Another type of prior art reclosing relay offers two attempts at reclosing the circuit breaker. Following circuit breaker tripping, a high-speed unit in this reclosing relay recloses the breaker after a predetermined time has elapsed and thereafter is locked out. Coincident with the high-speed reclosing command, the high-speed unit activates a time-delay unit. After the time-delay period, the time-delay then recloses the circuit breaker and locks out; it must be manually reset. If the circuit breaker remains closed after a reclosing command from either the high-speed unit or the time-delay unit, the reclosing relay is reset after the timer associated with that unit reaches the end of its cycle.

The lockout feature of the prior art protective relays prevents pumping of the circuit breaker. This condition occurs when there is a permanent fault on the transmission line and the reclosing relay causes the circuit breaker to reclose into that permanent fault. The circuit breaker then immediately opens. Without the lockout function, the reclsoing relay recloses the circuit breaker again, and since the fault is still extant, the protective relay monitoring the transmission line retrips to open the circuit breaker. This continuous opening and closing of the circuit breaker, which is called pumping, can cause circuit breaker and system damage. Lockout after reclosure is designed to prevent pumping.

In practice, it has been discovered that this prior art lockout scheme wherein lockout occurs when the circuit breaker recloses, does not provide a sufficiently reliable anti-pumping feature. It is desirable to provide a redundant lockout mechanism to ensure lockout of the reclosing relay if component failure causes a prior-art type of lockout mechanism to fail. It is also desirable for this redundant lockout system to be activated by a reclosure followed within a predetermined interval by a retrip.

SUMMARY OF THE INVENTION

A reclosing relay including a redundant lockout scheme is disclosed. The redundant lockout scheme utilizes a series of latches to count the number of circuit breaker recloses that are followed by retrips within a predetermined time. Lockout of the reclosing relay is achieved when the count reaches a predetermined value. The redundant lockout prevents circuit breaker pumping.

BRIEF DESCRIPTION OF THE DRAWINGS

The invention may be better understood, and further advantages and uses thereof more readily apparent, when considered in view of the following detailed description of exemplary embodiments, taken with the accompanying FIGURE, which is a block diagram of a reclosing relay constructed according to the teachings of the present invention.

DESCRIPTION OF THE PREFERRED EMBODIMENTS

The FIGURE illustrates, in block diagram form, a reclosing relay 10 constructed according to the teachings of the present invention. The reclosing relay 10 is a multi-shot reclosing relay. In the illustrated embodiment, the reclosing relay 10 provides two reclose commands to the circuit breaker although additional reclose commands can be provided by duplicating the reclosing circuitry disclosed.

A circuit breaker status detector 12 determines whether the circuit breaker (not shown in the FIGURE) is opened or closed. An input terminal of a first reclose circuit 14 is connected to an output terminal of the circuit breaker status detector 12. An input terminal of a delayed pick-up timer 16 is connected to an output terminal of the first reclose circuit 14. An input terminal of a one-shot multivibrator 18 is connected to the output terminal of the circuit breaker status detector 12. An output terminal of the one-shot multivibrator 18 is connected to a set input terminal of a flip-flop 20. A first input terminal of an AND gate 22 is connected to the output terminal of the circuit breaker status detector 12. A second input terminal of the AND gate 22 is connected to a Q output terminal of the flip-flop 20. An output terminal of the AND gate 22 is connected to an input terminal of a reset timer 24. An output terminal of the reset timer 24 is connected to a reset input terminal of the flip-flop 20. The one-shot multivibrator 18 and the flip-flop 20 constitute a primary lockout circuit 25.

An input terminal of a one-shot multivibrator 26 is also connected to the output terminal of the circuit breaker status detector 12. An output terminal of the one-shot multivibrator 26 is connected to a set input terminal of a flip-flop 28. A reset input terminal of the flip-flop 28 is connected to the output terminal of the reset timer 24. A Q output terminal of the flip-flop 28 is connected to a non-inverting input terminal of an AND gate 30. An inverting input terminal of the AND gate 30 is connected to the output terminal of the circuit breaker status detector 12. An output terminal of the AND gate 30 is connected to a set input terminal of a flip-flop 32. A reset input terminal of the flip-flop 32 is connected to the output terminal of the reset timer 24. An output terminal of the timer 16 is connected to a non-inverting input terminal of an AND gate 34. The Q output terminal of the flip-flop 20 is connected to a first inverting input terminal of the AND gate 34. The Q output terminal of the flip-flop 32 is connected to a second inverting input terminal of the AND gate 34. The one-shot multi-vibrator 26, the flip-flops 28 and 32, and the AND gate 30 constitute a redundant lockout circuit 33.

A non-inverting input terminal of an AND gate 46 is connected to the Q output terminal of the flip-flop 32. An inverting input terminal of the AND gate 46 is connected to the output terminal of the circuit breaker status detector 12. A first non-inverting input terminal of an AND gate 50 is connected to the Q output terminal of the flip-flop 32; a second non-inverting input terminal thereof is connected to the output terminal of the circuit breaker status detector 12.

An input terminal of a second reclose circuit 38 is connected to an output terminal of the AND gate 46. An output terminal of the second reclose circuit 38 is connected to an input terminal of a delayed pick-up timer 40. An input terminal of a one-shot multivibrator 42 is connected to an output terminal of the AND gate 50. A set input terminal of a flip-flop 44 is connected to an output terminal of the one-shot multivibrator 42. The AND gate 50, the one-shot multivibrator 42, and the flip-flop 44 constitute a primary lockout circuit 51. A reset input terminal of the flip-flop 44 is connected to the output terminal of the reset timer 24.

A first input terminal of an AND gate 48 is connected to the Q output terminal of the flip-flop 32. A second input terminal thereof is connected to the output terminal of the circuit breaker status detector 12. An output terminal of the AND gate 48 is connected to a set input terminal of a flip-flop 52; a reset input terminal thereof is connected to the output terminal of the reset timer 24. A Q output terminal of the flip-flop 52 is connected to a non-inverting input terminal of an AND gate 54. An inverting input terminal thereof is connected to the output terminal of the circuit breaker status detector 12. An output terminal of the AND gate 54 is connected to a set input terminal of a flip-flop 56. A reset input terminal thereof is connected to the output terminal of the reset timer 24. The AND gates 48 and 54, and the flip-flops 52 and 56 constitute a redundant lockout circuit 57.

An output terminal of the AND gate 34 is connected to a first input terminal of an OR gate 36; a second input terminal thereof is connected to an output terminal of the delayed pick-up timer 40. An output terminal of the OR gate 36 is connected to a non-inverting input terminal of an AND gate 58. A first inverting input terminal of the AND gate 58 is connected to the Q output terminal of the flip-flop 44; a second inverting input terminal thereof is connected to a Q output terminal of the flip-flop 56. The AND gate 58 produces a signal to reclose the circuit breaker (not shown in the FIGURE).

The embodiment of the reclosing relay 10 depicted in the FIGURE, provides two reclose commands after the circuit breaker opens. The first reclosure is provided by the first reclose circuit 14, via the delayed pick-up timer 16, the AND gates 34 and 58, and the OR gate 36. The primary lockout circuit 25 and the redundant lockout circuit 33 lockout the first reclose circuit 14 after the first reclosure. The second reclose circuit 38 produces the second reclose command. The primary lockout circuit 51 and the redundant lockout circuit 57 lockout the second reclosure circuit 38.

It is possible in other embodiments of the present invention to include several other units, like those illustrated, to provide additional reclosure commands to the circuit breaker. If additional units are added, a selector switch can also be included for manually choosing the number of reclosure commands to be produced by the reclosing relay 10 before lockout.

The reclosing relay 10 operates as follows. Under normal no-fault conditions, the flip-flops 20, 28 and 32 are reset such that the first and second inverting input terminals of the AND gate 34 are low. Due to the inversion at the first and second inverting input terminals, the AND gate 34 is enabled. Similarly, the flip-flops 44, 52, and 56 are reset such that the first and second inverting input terminals of the AND gate 58 are also low, and the AND gate 58 is enabled. When a protective relay opens the circuit breaker, the circuit breaker status detector 12 produces a low signal that activates the first reclose circuit 14. After the pick-up time of the delayed pick-up timer 16 has elapsed, a signal is produced therefrom, to drive the output terminal of the AND gate 34 high. Via the OR gate 36, the output of AND gate 58 also goes high and a reclose command is sent to the circuit breaker.

When the circuit breaker recloses the signal from the circuit breaker status detector 12 goes high. The low to high transition causes the one-shot multi-vibrators 18 and 26 to produce a single pulse. The pulse from the one-shot multivibrator 18 sets the flip-flop 20, and the first inverting input terminal of the AND gate 34 goes low. The AND gate 34 is now disabled, preventing additional reclosure commands from the first reclose circuit 14 from reaching the circuit breaker, i.e., the first reclose circuit 14 is locked out. While the circuit breaker is closed, the signal from the circuit breaker status detector 12 is high, and the first input terminal of the AND gate 22 is high. When the flip-flop 20 is set, the second input terminal of the AND gate 22 is also high. This condition causes the AND gate 22 to start the reset timer 24. If the circuit breaker remains closed during the reset time of the reset timer 24, the reset timer 24 times out and produces a high signal at the reset input terminal of the flip-flop 20, causing resetting thereof. Now the AND gate 34 has a low signal at the first inverting input terminal thereof and the reclosing relay 10 has returned to its normal no-fault state. If the circuit breaker reopens during the reset time of the reset timer 24, the flip-flop 20 is not reset, and the AND gate 34 remains disabled.

The redundant lockout circuit 33 provides a redundant disable signal for the AND gate 34 and thus a redundant lockout mechanism. This redundancy is provided as follows. When the circuit breaker closes after the first reclose command, the signal from the circuit breaker status detector 12 goes high causing the one-shot multi-vibrator 26 to produce a pulse. The pulse sets the flip-flop 28. The AND gate 30 now has a high signal at the first input terminal thereof. If the circuit breaker reopens before the reset timer 24 has timed out, the signal from the circuit breaker status detector 12 goes low and the output terminal of the AND gate 30 goes high to set the flip-flop 32. When the Q output terminal of the flip-flop 32 is high, the AND gate 34 is disabled such that additional reclose signals from the first reclose circuit 14 do not cause the AND gate 34 to go high, i.e., the circuit 33 does not provide lockout until the circuit breaker reopens after an unsuccessful reclosure, whereas the primary lockout circuit 15 provides lockout when the circuit breaker recloses.

Thus, the reclosing relay 10 provides two independent means for ensuring that the first reclose circuit 14 provides only a single reclose command to the circuit breaker. The primary lockout circuit 25 locks out the reclosing relay 10 on closing of the circuit breaker. The redundant lockout circuit 33 locks out the reclosing relay 10 on closing and subsequent reopening of the circuit breaker. Note that the reset timer 24, in addition to resetting the flip-flop 20, resets the flip-flops 28 and 32 if the circuit breaker remains closed for the predetermined reset time.

As noted above, the embodiment of the reclosing relay 10 in the FIGURE produces a second reclose command if the circuit breaker does not remain closed following the first reclose command. The additional elements of the Figure produce this second reclose command and include the primary lockout circuit 51 and the redundant lockout circuit 57 for locking out the reclosing relay 10 after the second reclose command.

In the prefault condition the flip-flops 44, 52, and 56 are reset. When the flip-flop 32 is set due to an unsuccessful first reclosure, the AND gates 46, 48, and 50 are enabled by the high signal from the Q output terminal of the flip-flop 32. The inverting input terminal of the AND gate 46 goes low when the circuit breaker reopens after the first unsuccessful reclosure, therefore the AND gate 46 goes high to activate the second reclose circuit 38. After the pick-up time of the delayed pick-up timer 40 has elapsed, the output terminal thereof goes high and a second reclose command is sent to the circuit breaker via the OR gate 36 and the AND gate 58 (which is enabled by the low signals at the first and second inverting terminals thereof). When the circuit breaker closes, the second input terminal of the AND gate 50 goes high causing the one-shot multivibrator 42 to produce a pulse to set the flip-flop 44. Now the first inverting input terminal of the AND gate 58 is high and the AND gate 58 is disabled. Additional reclose commands from the second reclose circuit 38 cannot reach the circuit breaker.

Closing of the circuit breaker also causes the first input terminal of the AND gate 22 to go high; the second input terminal thereof is high because the flip-flop 20 is still set. Therefore, the high signal from the AND gate 22 activates the reset timer 24. If the circuit breaker remains closed during the reset time of the reset timer 24, at the end of the reset time the flip-flop 44 is reset, and the first inverting input terminal of the AND gate 58 is low. The reclosing relay 10 is now in its normal no-fault state. If the circuit breaker reopens during the reset time of the reset timer 24, the flip-flop 44 is not reset, and the AND gate 58 remains disabled. Now the second reclose circuit 38 is locked out by the primary lockout circuit 51.

The redundant lockout circuit 57 provides the redundant lockout feature for the second reclose command. After the first unsuccessful reclosure, the Q output terminal of the flip-flop 32 is high thereby enabling the AND gate 48. When the circuit breaker recloses in response to the second reclose command, the output terminal of the AND gate 48 goes high to set the flip-flop 52. If the circuit breaker reopens before the reset timer 24 has timed out, the AND gate 54 goes high to set the flip-flop 56. Now the AND gate 58 is disabled by the high signal at the second inverting input terminal thereof. Thus, a redundant lockout or disable feature is provided independent of the primary lockout feature provided by the primary lockout circuit 51. Note that the primary lockout circuit 51 provides lockout when the circuit breaker recloses; the redundant lockout circuit 57 provides lockout when the circuit breaker reopens after an unsuccessful reclosure.

Additional circuitry can be added to the embodiment of the reclosing relay 10 to provide any number of reclose commands. Also, any number of additional circuits, like the redundant lockout circuit 57, can be included to provide lockout after any number of recloses and retrips within a predetermined interval.

What is claimed is:

1. Reclosing relay apparatus for reclosing a circuit breaker in an electrical power system when the circuit breaker trips in response to a fault in the electrical power system, said apparatus including a reclosing stage with two lockout circuits for reliably preventing circuit breaker pumping, and detector means for determining the trip status and reclosure status of the circuit breaker and for generating a status signal representative thereof, said reclosing stage comprising:

reclosing means governed by said status signal for reclosing the circuit breaker after a first predetermined time interval measured from the initiation of a trip status of the circuit breaker as indicated by said status signal;

first lockout circuit governed by said status signal for setting a first lockout signal upon reclosure of the circuit breaker as indicated by said status signal to disable said reclosing means from reclosing the circuit breaker;

second lockout circuit governed by said status signal for setting a first lockout signal, independent of said first lockout circuit, to redundantly disable said reclosing means from reclosing the circuit breaker, said second lockout circuit comprising:

first circuit stage governed by the status signal for generating an intermediate signal upon reclosure of the circuit breaker as indicated by said status signal; and second circuit stage governed by said intermediate signal and the status signal for setting the second lockout signal upon retrip of the circuit breaker as indicated by the combination of the status and intermediate signals; and reset means for resetting said first and second lockout signals after a second predetermined time interval measured from the initiation of said reclosure status of the circuit breaker to enable said reclosing means for reclosing the circuit breaker, said second predetermined time interval being longer than said first predetermined time interval.

2. The reclosing relay apparatus of claim 1 wherein the first circuit stage of the second lockout circuit includes:

pulse means governed by the status signal for producing a pulse when the circuit breaker recloses after a trip as indicated by said status signal; and a first latch responsive to said pulse for setting the intermediate signal; and wherein the second circuit stage of the second lockout circuit includes;

a second latch responsive to the combination of a set intermediate signal and the status signal indicating a retrip status of the circuit breaker to set the second lockout signal independent of the setting of the first lockout signal.

3. Reclosing relay apparatus for reclosing a circuit breaker in an electrical power system when the circuit breaker trips in response to a fault in the electrical power system, and for reliably preventing circuit breaker pumping, said reclosing relay apparatus comprising:

detector means for determining the trip status and reclosure status of the circuit breaker and for generating a status signal representative thereof;

a plurality of reclosing stages arranged in a predetermined operational order, each reclosing stage comprising:

reclosing means operative to reclose the circuit breaker after a first predetermined time interval measured from the initiation of a trip status of the circuit breaker as indicated by said status signal;

first lockout circuit operative to set a first lockout signal upon reclosure of the circuit breaker as indicated by said status signal to disable said reclosing means from reclosing the circuit breaker; and second lockout circuit operative to set a second lockout signal, independent of said first lockout circuit, to redundantly disable said reclosing means from reclosing the circuit breaker, one of said reclosing stages being an initial operational stage of said predetermined operational order, said initial operational stage includig means for activating a next stage subsequent to completion of its circuit breaker reclosure operation, other stages of said plurality also including means for activating the next stage in said predetermined operational order with each activated stage repeating the functions of the prior stage of said order; and reset means for resetting said first and second lockout signals of said plurality of reclosing stages after a second predetermined time measured from the initiation of an initial reclosure status with regard to said predetermined operational order to enable said reclosing means of said plurality of reclosing stages for reclosing the circuit breaker, said second predetermined time interval being longer than said first predetermined time interval.

4. A single reclosing relay stage including: means for reclosing a circuit breaker in an electrical power system when the circuit breaker trips in response to a fault in the electrical power system, and a first lockout circuit for locking out said reclosing means from reclosing the circuit breaker after a predetermined number of reclosures if the circuit breaker then trips before a reset timer times out; wherein the improvement comprises:

second lockout circuit for redundantly locking out said reclosing means from reclosing the circuit breaker independent of said first lockout circuit, said second lockout circuit including:

a first circuit stage which is set when the circuit breaker recloses on said predetermined number of reclosures; and a second circuit stage which is set when the circuit breaker trips and said first circuit stage is set, said reclosing means being redundantly locked out during the time that said second circuit stage is set, said first and second circuit stages being reset upon said reset timer timing out.

* * * * *